Jan. 12, 1954    J. J. GLANDER    2,665,957
LUBRICANT SEAL
Filed March 17, 1949

INVENTOR
James J. Glander

By Strauch & Hoffman
Attorneys

Patented Jan. 12, 1954

2,665,957

UNITED STATES PATENT OFFICE 2,665,957

LUBRICANT SEAL

James J. Glander, Detroit, Mich., assignor, by mesne assignments, to Rockwell Spring and Axle Company, Coraopolis, Pa., a corporation of Pennsylvania Application March 17, 1949, Serial No. 81,937

9 Claims. (Cl. 308—120)

This invention relates to a novel lubricant seal arrangement and particularly to one wherein lubricant is maintained under pressure for a considerable period.

The invention will be particularly described according to its preferred embodiment as it is employed at one end of a king pin of the steering axle of a vehicle, but it will be understood that the principles of the invention are more widely applicable and may be employed in other lubricated bearings wherein a combined closure and pressure maintaining arrangement are desired.

In its application to a king pin assembly at the front axle of the motor vehicle, the invention is employed to replace hitherto unsatisfactory arrangements for sealing the steering knuckle bore opening opposite the lower end of the king pin and for maintaining adequate lubrication of the adjacent bearing. In the usual dirigible axle of present day manufacture, the steering knuckle, on which is mounted the wheel supported spindle, is journalled on a stationary king pin, the steering knuckle bore in which the king pin is disposed being lubricated. After the king pin is inserted into the bore it is necessary to seal the opening to prevent the entry of dirt and water and to maintain an adequate supply of lubricant inside the bore. It is in connection with this lubricant seal that the preferred embodiment of the invention is directed.

It has been proposed to simply close this opening with a flat disc of metal retained therein by a snap ring but this has proved unsatisfactory because, while it kept out dirt and moisture fairly well, it was not a satisfactory lubricant seal because lubricant inserted radially under pressure into the bore as by an ordinary lubricant fitting escaped around the edges of the disc, and extremely careful observation was necessary to prevent this bearing from running dry.

It was then proposed to employ at this opening a spring metal disc of concave-convex curvature of the type which is commonly known as a Welch plug and which is much the same as that disclosed in the original Welch Patent No. 1,058,210 or Northrup Patent 1,730,377. This plug was usually pressed and expanded into a shallow enlarged shoulder at the mouth of the opening and flattened and expanded into a tight peripheral fit with the shoulder with its normally concave inner side facing the bottom of the king pin. This closure proved to be much better than the disc and snap ring arrangement, but trouble arose from the fact that internal lubricant pressure tended to displace the plug outwardly from its seat. This lubricant pressure tended to restore the stressed Welch plug element toward its original undeformed concave-convex condition, which condition it readily tended to reassume, and it soon became loose around the edges and lubricant leaked out of the bore.

According to the present invention, I have specifically solved this problem by the provision of a lubricant seal where a resilient expansible closure element like a relaxed Welch plug, more particularly a concave-convex preformed disc of spring metal, is disposed within the lower part of the bore and axially held therein by a peripheral snap ring arrangement. This element in assembly is placed loosely and freely within the bore with its convex side facing toward the bottom of the king pin and hence facing the lubricant pressure. When lubricant is introduced under pressure through the usual alemite or like fitting into the bore above the disc element, it causes the disc to seat peripherally on the snap ring and then expand into tight contact with the bore. Actually it becomes somewhat flattened so that its periphery engages the inner periphery of the bore like the usual Welch plug. It thereby provides a tight seal preventing the escape of lubricant and the entry of dirt and water. The snap ring of course prevents the element from being forced out of the opening, and the higher the lubricant pressure the tighter the seal.

A major object of the invention is to provide a novel sealing arrangement for one end of a bore containing a lubricant under pressure wherein a flexible, preferably resilient expansible closure element is loosely mounted within the bore and expanded into tight closure relation with the bore by lubricant pressure.

It is a further object of the invention to provide a sealing enclosure for a bore containing lubricant under pressure wherein a flexible cup-shaped disc is loosely mounted in the bore and peripherally held against outward displacement while being axially deformed and radially expanded by lubricant pressure to peripherally grip the bore.

It is a further object of my invention to provide a novel sealing arrangement for sealing an opening containing a supply of lubricant under pressure wherein the opening is closed by a concave-convex disc of spring metal with its convex side exposed to lubricant pressure whereby the pressure causes the disc to deform and expand for tightly gripping the periphery of the opening.

Further objects of the invention will become apparent as the description proceeds in connection with the appended claims and the annexed drawings wherein:

Figure 1:
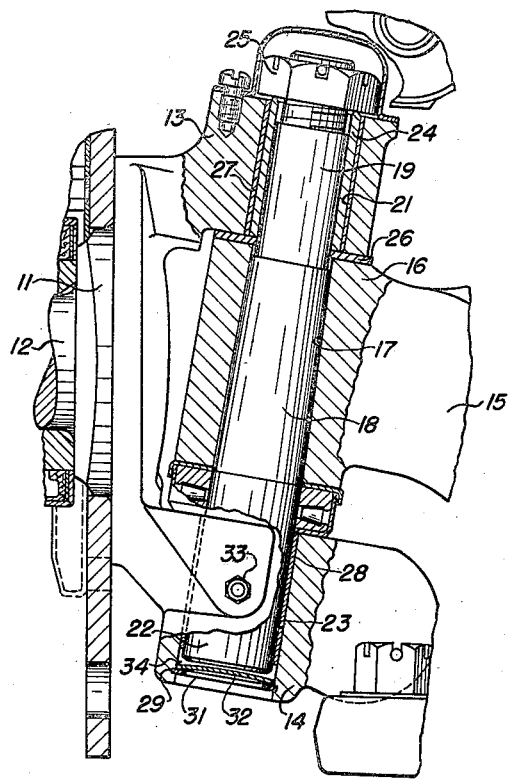
Figure 1 is a fragmentary elevation partly broken away and in section illustrating a front axle king pin assembly embodying a preferred form of the invention.
Figure 3:
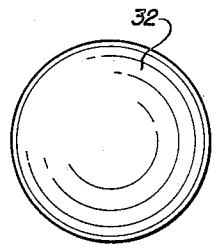
Figure 3 is a plan view of one of the spring disc elements of the invention.

Referring to the drawings wherein like parts are designated by the same numerals, the steering knuckle 11 on which is formed the wheel bearing spindle 12 is formed integrally at its inner end with a yoke comprising an upper jaw 13 and a lower jaw 14. The stationary front axle 15 is formed with an arm 16 which extends between the jaws of the yoke and is formed with a tapered bore 17 that is larger at its lower end than at its upper end. A king pin 18 is press fitted tightly and non-rotatably within bore 17 and comprises an upper cylindrical portion 19 projecting within the bore 21 of upper yoke jaw 13 and a lower cylindrical portion 22 projecting within the cylindrical bore 23 of the lower yoke arm 14. In assembly the smaller end of the king pin is inserted through lower jaw 14 and into bore 17 where it is pressed tight. Surrounding upper pin portion is a sleeve 24 which is clamped between a nut 25 on the threaded upper end of the king pin and a thrust washer 26 disposed between arm 16 and jaw 13. A suitable bushing of bearing metal 27 surrounds the sleeve 24 within bore 21, whereby free rotation is provided between the yoke jaw 13 and the king pin, and a suitable lubricant fitting is provided for introducing lubricant into the bore 21 for lubricating this bushing as will appear. This general construction is fairly conventional, and per se is not part of the present invention.

At the lower jaw of the yoke, cylindrical pin portion 22 is surrounded within bore 23 by a sleeve bushing 28 press fitted into the bore. The king pin terminates short of the lower end of bore 23. Spaced a small distance inwardly from the lower end of bore 23 is an internal circumferential groove 29 wherein is disposed a suitable contractible and expansible snap ring 31, and above the snap ring a flexible radially expansible element consisting of an expansible circular disc element 32 is disposed below the bottom of the king pin.

Element 32 is a thin concave-convex disc of thin spring metal which is preformed into that shape and tends to return to it even when retained in deformed condition. Preferably element 32 is a circular spherical sector on a spherical radius larger than the diameter of the plug.

A lubricant fitting of the usual type indicated at 33 is provided for introducing lubricant under usual grease gun pressure into the space between bushing 28 and the king pin and into the space below the king pin end indicated at 34, in which latter space the lubricant is in direct contact with the upper convex face of element 32.

Figure 2:
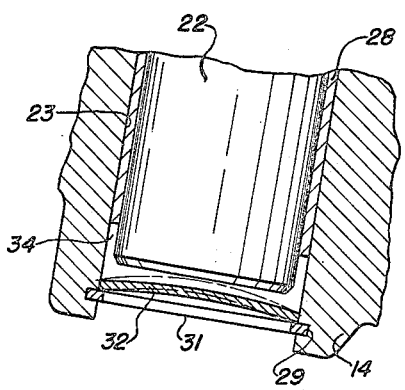
Figure 2 is an enlarged sectional view of the lower end of the king pin bore to more clearly illustrate the invention.

As lubricant under pressure is introduced through fitting 33, the disc element 32 having been loosely placed within the lower end of the bore 23 with its convex side facing the king pin end and simply held from dropping out by snap ring 31 as illustrated in the phantom lines in Figure 2, the lubricant pressure tends to displace element 32 outwardly of the bore 23. However, since the periphery of the disc element 32 abuts snap ring 31, outward axial movement is prevented and instead the flexibility and resiliency of the element permits it to axially deform toward the flattened condition illustrated in Figure 2 under the pressure of the lubricant. As it approaches this condition, its entire outer periphery is tightly forced against the inner periphery of bore 23, and when the final deformed tight position illustrated in full lines in Figure 2 is attained, none of the lubricant can escape around the edge of the disc and increased lubricant pressure only tends to seat the disc more tightly. This tight seal means that adequate lubricant can be forced into the space between bushing 28 and bore 23 when the grease gun is applied to fitting 33.

Figure 4:
Figure 4 is a cross section of the element of Figure 3.

During operation of the vehicle, the continued tendency of deformed disc 32 to return to its original concave-convex condition of Figure 4 maintains a substantially constant pressure forcing and maintaining lubricant up between the bushing and the cylindrical lower end of the king pin. However should the original lubricant pressure be tight enough to drive the plug into a tight binding fit with the bore, this is satisfactory since the primary seal function is preserved.

Also, should some lubricant become dissipated from bore 23, the resultant decrease in lubricant pressure may be accompanied by a tendency of the element 23 to return toward its relaxed condition which thereby means that it will continue to exert pressure urging the lubricant up into the bushing for a considerable period.

The above described sealing arrangement is simple and easy to assemble, requiring no special machining. Also the expansion ring and disc can be reused after the king pin assembly is taken down for repair since they are not destroyed in the disassembly.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with a member having a cylindrical bore open at an end, a circular, flexible, radially-expansible, concave-convex closure element having a diameter slightly less than said bore, when there is no fluid pressure in said bore, so that it is relatively freely mounted in said bore with its concave side facing said open end of the bore, means for preventing axial displacement of said element through said open end, and means for introducing fluid under pressure into said bore inwardly of said member so that said fluid pressure will tend to expand said element into peripheral contact with said bore.

2. In combination with a member having an opening surrounded by a cylindrical wall, a flexible, radially-expansible, closure disc which is concave-convex in cross section having a relaxed diameter slightly less than said wall so as to be relatively freely mounted in said opening, a peripheral stop preventing said disc from being displaced through said opening, and means for introducing a fluid under pressure into said member inwardly of said disc so that said disc is expanded under fluid pressure into sealing contact with said wall of the opening.

3. In a seal, a member adapted to contain fluid under pressure and having a cylindrical walled opening, a concave convex disc of spring metal having a relaxed diameter slightly less than said opening wall so as to be relatively freely disposed in said opening with its convex side facing inwardly, means for preventing outward axial displacement of said disc under fluid pressure within said member but permitting deformation and radial expansion of said disc into sealing contact with the wall of said opening, and means for introducing fluid under pressure into said member inwardly of said disc.

4. A lubricant sealing arrangement for an end opening of a bore adapted to contain lubricant under pressure comprising a flexible, radially-expansible, closure element that is concave-convex in cross-section and of the same peripheral shape as but slightly smaller than said bore, when there is no lubricant within the bore, relatively freely mounted across said bore with its convex side facing inwardly of said bore, and means for preventing displacement of said element outward toward the said opening of said bore, said means permitting deformation and expansion of said element under lubricant pressure into peripheral sealing contact with said bore.

5. In a bearing assembly, a member having a bore, a bearing in said bore, means for introducing lubricant for said bearing under pressure into said bore, and means for sealing the end of said bore comprising a flexible, radially-expansible, closure element that is concave-convex in cross section and of the same peripheral shape as but slightly smaller than said bore end, when there is no lubricant within the bore, mounted across said bore with its convex side facing inwardly of said bore so as to be expanded by pressure of lubricant in the bore into tight peripheral engagement with said bore, and means adapted to be rigidly contacted by said closure element for preventing outward axial displacement of said closure element in said bore under lubricant pressure.

6. In a lubricant seal assembly, a member having a bore, a pin projecting into one end of said bore, a bearing between the pin and bore, means for introducing lubricant under pressure into said bore for lubricating said bearing, means for sealing the other end of said bore to prevent escape of said lubricant comprising a radially-expansible, closure element of concave-convex cross section having the same peripheral shape as but slightly smaller than said bore end, when there is no lubricant in said bore, mounted across the bore end with its convex side facing inwardly of the bore so that it may be expanded into peripheral contact with said bore by said lubricant pressure, and means adapted to be abutted by said closure element for preventing axial outward displacement of said closure element in said bore under lubricant pressure.

7. A joint comprising an internal member, a pin supported by said internal member, an outer member, bores in said outer member forming seats for bearings surrounding said pin, a flexible, concave-convex closure disc mounted across the outer end of at least one of said bores, said disc having a relaxed diameter only slightly less than said bore end and coacting with the bore to form a lubricant sump beyond the outer end of the pin, means for injecting lubricant under pressure into said sump to tend to axially compress and thereby radially expand said disc into tight peripheral contact with said bore to form an effective lubricant seal across said bore, and means adapted to be peripherally abutted by said disc for preventing outward axial displacement of said disc in said bore under lubricant pressure.

8. In combination, a shaft, a member having a bore closely embracing said shaft and extending axially beyond one end thereof, a seal element closing said bore and axially removed from said shaft end so as to provide a lubricant chamber thereabove in said bore, said seal element comprising a flexible, radially-expansible, concave-convex disc mounted across said bore and having its convex surface disposed toward the end of said shaft, the diameter of said seal element when relaxed being slightly smaller than said bore whereby fluid pressure within said chamber will tend to axially compress and thereby radially expand said disc and increase its sealing engagement with said bore, and a relatively stationary annular member adapted to be peripherally contacted by said disc for preventing outward axial displacement of said disc in said bore under lubricant pressure.

9. In a vehicle front axle, a king pin, a steering knuckle journalled on said pin and having a bore containing a bearing for said pin and open at its bottom, means for introducing lubricant under pressure into said bore, and sealing means at the lower end of said bore beyond the lower end of said pin comprising a relatively free, concave-convex disc of the same peripheral shape as but slightly smaller than said bore disposed in said bore with its convex side facing said lower pin end, and a removable snap ring seated in a groove in said bore below said disc for preventing the disc from dropping out of said bore and for preventing axial movement of the disc as it is flattened by lubricant pressure into increased peripheral sealing contact with said bore.

JAMES J. GLANDER.

References Cited in the file of this patent

UNITED STATES PATENTS

| Number | Name | Date |
| --- | --- | --- |
| 1,058,210 | Welch | Apr. 8, 1913 |
| 1,371,594 | Alden | Mar. 15, 1921 |
| 1,730,377 | Northrup | Oct. 8, 1929 |
| 1,774,946 | Rankin | Sept. 2, 1930 |
| 1,801,006 | Jacoby | Apr. 14, 1931 |
| 1,981,802 | Gleason | Nov. 20, 1934 |
| 2,457,770 | Bogard | Dec. 28, 1948 |